(12) United States Patent
Chen

(10) Patent No.: US 7,238,737 B2
(45) Date of Patent: *Jul. 3, 2007

(54) IONOMERS MODIFIED WITH ROSIN AND ARTICLES THEREOF

(75) Inventor: John Chu Chen, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/859,421

(22) Filed: Jun. 2, 2004

(65) Prior Publication Data

US 2005/0020742 A1    Jan. 27, 2005

Related U.S. Application Data

(60) Provisional application No. 60/475,723, filed on Jun. 2, 2003, provisional application No. 60/542,762, filed on Feb. 6, 2004.

(51) Int. Cl.
- *A63B 37/00* (2006.01)
- *A63B 37/12* (2006.01)
- *C08K 5/098* (2006.01)

(52) U.S. Cl. ............ 524/272; 524/270; 473/371; 473/373; 473/385

(58) Field of Classification Search ........ None
See application file for complete search history.

(56) References Cited

U.S. PATENT DOCUMENTS

| | | | | |
|---|---|---|---|---|
| 3,823,108 | A | * | 7/1974 | Bissot ............ 524/272 |
| 4,322,326 | A | | 3/1982 | Pyle |
| 4,337,298 | A | | 6/1982 | Karim et al. |
| 5,007,643 | A | | 4/1991 | Okumoto et al. |
| 5,312,857 | A | * | 5/1994 | Sullivan ............ 524/400 |
| 6,371,869 | B1 | | 4/2002 | Kato et al. |
| 6,608,127 | B1 | | 8/2003 | Kato et al. |
| 6,663,510 | B1 | * | 12/2003 | Iwami et al. ............ 473/378 |

| | | | |
|---|---|---|---|
| 2005/0020741 | A1 | * 1/2005 | Chen ............ 524/270 |

FOREIGN PATENT DOCUMENTS

| | | |
|---|---|---|
| EP | 0 737 493 B1 | 7/2002 |
| FR | 2523854 | 9/1983 |
| GB | 2 132 092 A | 7/1984 |
| JP | 57203460 A | 12/1982 |
| JP | 59194802 A | 11/1984 |
| JP | 62224382 A | 10/1987 |
| JP | 02124182 A | 5/1990 |
| JP | 04002375 A | 1/1992 |
| JP | 04015702 B | 3/1992 |
| JP | 04144704 A | 5/1992 |
| JP | 3302407 A | 2/1994 |
| JP | 09225076 A | 9/1997 |
| WO | WO 99/48569 | 9/1999 |
| WO | WO 01/29129 A1 | 4/2001 |
| WO | WO 02/04694 A1 | 1/2002 |
| WO | WO 02/10470 A1 | 2/2002 |
| WO | WO 02/14422 A1 | 2/2002 |

OTHER PUBLICATIONS

The Merck Index, Tenth Edition, date 1983, p. 1191, entry 8134, Merck & Co., Inc., Rahway, NJ USA.
The Merck Index, Tenth Edition, date 1983, p. 1299, entry 8917, Merck & Co., Inc., Rahway, NJ USA.
PCT International Search Report, International application No. PCT/US2004/017589, dated Oct. 20, 2004.

* cited by examiner

*Primary Examiner*—David J. Buttner
(74) *Attorney, Agent, or Firm*—Maria M. Kourtakis; Kelly Law Registry

(57) ABSTRACT

Disclosed are thermoplastic compositions comprising partially or fully neutralized carboxylic acid-based ionomers modified with rosin or rosin derivatives and, optionally, organic acids and salts thereof. Methods of preparing the thermoplastic compositions are also provided. The thermoplastic compositions exhibit higher hardness and stiffness than typical ionomer compositions. Also disclosed are golf balls, sporting equipment, and other non-sport articles comprising said thermoplastic compositions and methods for their preparation.

23 Claims, No Drawings

IONOMERS MODIFIED WITH ROSIN AND ARTICLES THEREOF

CROSS-REFERENCE TO RELATED APPLICATIONS

The present application claims priority under 35 U.S.C. § 120 to U.S. Provisional Appln. No. 60/475,723, filed on Jun. 2, 2003, and to U.S. Provisional Appln. No. 60/542,762, filed on Feb. 6, 2004, both of which are incorporated herein in their entirety. Related U.S. Appln. No. 10/859,390, concurrently filed, entitled "IONOMERS MODIFIED WITH ROSIN AND ARTICLES THEREOF" is also incorporated herein in its entirety.

FIELD OF THE INVENTION

The present invention relates to thermoplastic compositions, and specifically to thermoplastic compositions comprising partially or fully neutralized carboxylic acid-based ionomers modified with rosin or rosin derivatives and, optionally, organic acids and salts thereof. The compositions of the invention, which exhibit higher hardness and stiffness than typical ionomer compositions, may also contain thermoplastic non-ionomeric polymers, fillers and/or fibers, and other additives.

BACKGROUND OF THE INVENTION

Several patents and publications are cited in this description in order to more fully describe the state of the art to which this invention pertains. The entire disclosure of each of these patents and publications is incorporated by reference herein.

Ionomeric resins (ionomers) are copolymers of an olefin such as ethylene and an unsaturated carboxylic acid, such as acrylic acid, methacrylic acid, or maleic acid, and optionally softening monomers, in which some portion of the acidic groups in the copolymer is neutralized with metal ions such as sodium or zinc. Ionomers are thermoplastic resins exhibiting enhanced properties, e.g. improved resilience, stiffness or softness, toughness, durability, etc. for golf ball cover construction over balata (see below). As a result of their resilience, toughness, durability and cut resistance, various ionomeric resins sold by E. I. du Pont de Nemours & Company of Wilmington, Del. (DuPont) under the trademark "Surlyn®" and by the ExxonMobil Chemical Corporation of Houston, Tex. under the tradenames "Escor™" and "Iotek™" have become materials of choice for the construction of golf ball covers instead of the traditional balata (natural or synthetic rubber) covers. The softer balata covers, although exhibiting enhanced playability, lack the durability and cut resistance desirable for repetitive play. In addition to their improved durability, harder covers or mantles tend to minimize ball spin and maximize the straightness of the ball's travel off the clubface. Some golfers prefer golf balls that maximize distance and provide low spin characteristics. Thus, it is desirable to continue developing materials for golf balls with increased hardness and stiffness.

Current commercial ionomers derived from dipolymers have properties that vary according to the type and amount of metal cations, molecular weight and composition of the base resin (i.e. relative content of ethylene and methacrylic and/or acrylic acid groups). Ionomers can also be modified by the addition of comonomers to modify their physical properties. For example, terpolymers made from an olefin such as ethylene, an unsaturated carboxylic acid and other comonomers such as alkyl (meth)acrylates provide "softer" resins, which can be neutralized to form softer ionomers.

Approaches to providing harder ionomers include the use of relatively high percentages of the carboxylic acid moieties in the copolymer. Disadvantageously, ethylene acid copolymers with high levels of acid are difficult to prepare in continuous polymerizers because of monomer-polymer phase separation. This difficulty can be avoided by use of "co-solvent technology" as described in U.S. Pat. No. 5,028,674 or by employing somewhat higher pressures than those at which copolymers with lower acid can be prepared. Despite these expedients, there is an inherent limit to the amount of carboxylic acid that can be incorporated as a monomer in ethylene acid copolymers. In addition, such methods result in higher costs and more complex processes.

The properties of thermoplastic resins, such as ethylene acid copolymers and ionomers thereof, can also be modified by blending other components into a polymer melt. For example, U.S. Pat. No. 6,608,127 describes golf balls having covers comprising an ionomeric resin modified by the addition of terpene resin tackifiers and/or rosin ester tackifiers. Similarly, U.S. Pat. No. 6,371,869 describes golf balls having covers comprising an ionomeric resin modified by the addition of thermoplastic elastomers and terpene resin tackifiers and/or rosin ester tackifiers. The compositions used for golf ball covers in these patents are characterized as having Shore D hardness of from 40 to 65.

Thus, it is desirable to develop a material for golf ball covers, mantles, intermediate layers, etc., having a combination of hardness, stiffness and good scuff resistance with improved heat stability and melt processibility. It is particularly desirable to develop compositions of ethylene acid copolymers with low to medium acid content that exhibit hardness comparable to or exceeding that exhibited by high acid copolymers.

Accordingly, one object of this invention is to provide an ionomer composition that is harder and stiffer than typical ionomeric compositions.

A further object of this invention is to provide a golf ball with a hard cover and/or intermediate layers having good resilience and durability.

A further object of this invention is to provide a golf ball having a favorable combination of low spin, durability and distance-carrying flight characteristics.

A further object of the invention is to provide a golf ball that is easy to prepare having a hard and stiff cover and/or intermediate layers. A further object of the invention is to provide a replacement for metal and wood components in sporting equipment, particularly golf clubs.

SUMMARY OF THE INVENTION

These and other objects of the invention can be realized by ionomer compositions that are harder than typical ionomeric resins and that incorporate rosin and/or rosin derivatives as modifiers, and also by preparing golf balls comprising the harder ionomer compositions of this invention.

Accordingly, in a first aspect, the invention provides a thermoplastic composition comprising an ionomer and a rosin, a rosin derivative, or both a rosin and a rosin derivative, provided that when the rosin component consists of a rosin ester, the thermoplastic composition also includes an organic acid, a salt of an organic acids, or both an organic acid and a salt of an organic acid.

Of note is a thermoplastic composition of the invention comprising:

(i) at least one E/X/Y copolymer where E is ethylene, X is a $C_3$ to $C_8$ α,β-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer;

(ii) from about 3 weight % to about 50 weight % of rosin, rosin derivative, or a combination of rosin and rosin derivative; and optionally (iii) from about 5 weight % to about 50 weight % of one or more organic acids or salts thereof; such that the combined weight % of component (ii) and component (iii) when present is from about 3 weight % to about 60 weight % of the total composition; wherein the combined carboxylic acid functionalities in all ingredients in the blend are at least partially neutralized by one or more alkali metal, transition metal, or alkaline earth metal cations; provided that when component (ii) consists of rosin ester, component (iii) must be present.

Of note is the composition comprising:

(i) at least one E/X/Y copolymer where E is ethylene, X is a $C_3$ to $C_8$ α,β-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer; and (ii) from about 3 weight % to about 50 weight % of rosin; wherein the combined carboxylic acid functionalities in all ingredients in the blend are at least partially neutralized by one or more alkali metal, transition metal, or alkaline earth metal cations.

This invention also provides the compositions above further comprising at least one additional component selected from non-ionomeric thermoplastic or thermoset polymers.

In another aspect, this invention provides a one-piece golf ball comprising a thermoplastic composition of this invention. This invention also provides a one-piece golf ball consisting essentially of a thermoplastic composition of this invention.

This invention also provides methods of making one-piece golf balls as described above, comprising molding a composition of this invention into the shape of a golf ball.

This invention also provides a multi-piece golf ball wherein any of the following components that form the golf ball, including the cover, the mantle, any intermediate layer, the core or the center, comprises a thermoplastic composition of this invention.

This invention also provides a multi-piece golf ball, wherein at least one of the components that form the golf ball comprises a thermoplastic composition of this invention and at least one other component comprises a non-ionomeric thermoplastic polymer.

This invention also provides a multi-piece golf ball wherein one of the components that form the golf ball consists essentially of a thermoplastic composition of this invention.

This invention also provides methods of making golf balls with covers, mantles, intermediate layers, cores and/or centers as described above, comprising obtaining a golf ball core or center and forming a cover, mantle, and/or intermediate layer over the core and/or the center formed of the thermoplastic compositions of this invention.

This invention also provides methods of making golf balls as described above, comprising molding a composition of this invention into the shape of golf ball mantles, intermediate layers, cores and/or centers and forming covers over them.

Also provided is a material that may replace metal and wood components in sporting equipment, particularly golf clubs, including an ionomer and a rosin, a rosin derivative, or both a rosin and a rosin derivative.

Of note is a composition comprising:

(i) at least one E/X/Y copolymer where E is ethylene, X is a $C_3$ to $C_8$ α,β-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer;

(ii) from about 3 weight % to about 50 weight % of rosin, rosin derivative, or a combination of rosin and rosin derivative; and optionally (iii) from about 5 weight % to about 50 weight % of one or more organic acids or salts thereof; such that the combined weight % of component (ii) and component (iii) when present is from about 3 weight % to about 60 weight % of the total composition; wherein the combined carboxylic acid functionalities in all ingredients in the blend are at least partially neutralized by one or more alkali metal, transition metal, or alkaline earth metal cations.

In another aspect, a molded article selected from the group consisting of sports shoe cleats, golf club face plates or inserts, molded golf club heads, club head coatings or casings, fillers for the inner cavity of a golf club head, and footwear structural components comprises the above thermoplastic composition of the invention.

In another aspect, this invention also provides a caulking material, sealant, modifier for cement and asphalt, or coating comprising the above thermoplastic composition of the invention.

DETAILED DESCRIPTION OF THE INVENTION

"Copolymer" means polymers containing two or more different monomers. The terms "dipolymer" and "terpolymer" mean polymers containing only two and three different monomers respectively. The phrase "copolymer of various monomers" means a copolymer whose units are derived from the various monomers.

Thermoplastic compositions are polymeric materials that flow when heated under pressure. Melt index (MI) is the rate of flow of a polymer through a specified capillary under controlled conditions of temperature and pressure. Melt indices reported herein are determined according to ASTM 1238 at 190° C. using a 2160 g weight, with values of MI reported in grams/10 minutes.

Ionomeric resins ("ionomers") are copolymers of an olefin, such as ethylene, and an unsaturated carboxylic acid, such as acrylic acid, methacrylic acid, or maleic acid, in which at least a portion of the acid groups is neutralized with at least one alkali metal, transition metal, or alkaline earth metal cation, such as lithium, sodium, potassium, magnesium, calcium, or zinc, or a combination of such cations, is used to neutralize some portion of the acidic groups in the copolymer.

The term "(meth)acrylic", as used herein, alone or in combined form, such as "(meth)acrylate", refers to acrylic and/or methacrylic, for example, acrylic acid and/or methacrylic acid, or alkyl acrylate and/or alkyl methacrylate. In this connection, "ethylene/(meth)acrylic acid (abbreviated E/(M)AA)" means a copolymer of ethylene (abbreviated E)/acrylic acid (abbreviated AA) and/or methacrylic acid (abbreviated MAA), which can then be at least partially neutralized by one or more alkali metal, transition metal, or alkaline earth metal cations to form an ionomer.

The term "rosin" as used herein, alone or in combined form, e.g., rosinic or rosinate, includes natural or modified rosins, natural or modified rosin acids, purified natural or modified rosin acids, salts of natural or modified rosin acids, including partially to completely neutralized mixtures of acids and salts, and combinations of one or more of the above rosins. Modifications of rosins, rosin acids, and rosin salts include hydrogenation, epoxidation, dimerization, and the like. Derivatizations of modified or natural rosins, rosin acids, and rosin salts include esterification, amidization, and the like.

The term "finite amount", as used herein, refers to an amount that is not equal to zero.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Some thermoplastic compositions of the invention preferred for use in golf balls include an ionomer and a rosin, a rosin derivative, or both a rosin and a rosin derivative, provided that when the rosin component consists of rosin ester, the thermoplastic composition also includes an organic acid, a salt of an organic acid, or both an organic acid and a salt of an organic acid.

Suitable precursors for the ionomers useful in the present invention are acid copolymers, preferably "direct" acid copolymers. They are preferably copolymers of an alpha olefin, more preferably ethylene, with a $C_3$ to $C_8$, $\alpha,\beta$ ethylenically unsaturated carboxylic acid, more preferably (meth)acrylic acid.

The acid copolymers may optionally contain a third "softening" monomer that disrupts the crystallinity of the polymer. These acid copolymers, when the alpha olefin is ethylene, can be described as E/X/Y copolymers wherein E is ethylene, X is the $\alpha,\beta$ ethylenically unsaturated carboxylic acid (as described above), particularly acrylic and methacrylic acid, and Y is the softening co-monomer. Preferred softening co-monomers are $C_1$ to $C_8$ alkyl acrylate or methacrylate esters. Other softening comonomers include maleic anhydride and maleic acid mono-esters. X and Y can be present in a wide range of percentages, X typically up to about 35 weight percent (wt. %) of the polymer and Y typically up to about 50 weight percent of the copolymer.

The copolymer(s) of alpha olefin, $C_3$ to $C_8$ $\alpha,\beta$ ethylenically unsaturated carboxylic acid and optional softening monomer from which the melt processible ionomers described above are prepared can be made by methods known in the art. Suitable copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like.

Suitable ionomers for use in the invention include melt-processible, at least partially neutralized copolymers of ethylene and $C_3$ to $C_8$ $\alpha,\beta$ ethylenically unsaturated carboxylic acids. Preferred ionomers for use in the present invention include E/(M)AA dipolymers having from about 2 to about 30 weight % (M)AA, at least partially neutralized by one or more alkali metal, transition metal, or alkaline earth metal cations. Methods of neutralizing acid copolymers to form ionomers are well known in the art.

Rosin is the residue left after distilling off the volatile oil from the oleoresin obtained from *Pinus palustris* and other species of *Pinus, Pinaceae*. It is available as wood rosin (from Southern pine stumps), gum rosin (the exudates from incisions in the living tree, *P. palustris* and *P. caribaea*), and tall oil rosin. Rosin typically contains about 90% rosin acids and about 10% neutral matter. Of the rosin acids about 90% are isomeric with abietic acid ($C_{20}H_{30}O_2$); the other 10% is a mixture of dihydroabietic acid ($C_{20}H_{32}O_2$) and dehydroabietic acid ($C_{20}H_{28}O_2$). (See *The Merck Index, Tenth Ed*. Rahway, N.J., USA, 1983, page 1191, entry 8134). Rosin acids can also be obtained from tall oil, also known as liquid rosin, which is a byproduct of the wood pulp industry and is usually recovered from pine wood "black liquor" of the sulfate or kraft paper process. Tall oil contains rosin acids (34-40%), fatty acids such as oleic and linoleic acids (50-60%) and neutral matter (5-10%). (See *The Merck Index, Tenth Ed*., page 1299, entry 8917).

The acids present in natural rosin may be purified by, for example, saponification, extraction of the neutral matter and reacidification. The free acid moieties in rosins can be modified by, for example, forming carboxylate salts by saponification to provide partially to completely neutralized salts with metal ions, e.g. resinate. Rosin acids can also be modified by chemical processes such as hydrogenation, dimerization, epoxidation, etc., that alter that chemical structure of the molecules while leaving the acidic functionalities unaffected.

Rosin is available commercially in several grades, for example, under the tradename "Resinall™" from Resinall Corporation, of Stamford, Conn. (Resinall), and like products supplied by Hercules of Wilmington, Del., Eastman Chemical Company of Kingsport, Tenn. (Eastman), Arakawa Chemical (USA), Inc., of Chicago, Ill., and others.

Derivatives of rosin can also be prepared by reacting at least a portion of its carboxylic acid moieties, or of the carboxylate anions or acid chloride groups or the like, with moieties that form covalent bonds with the carboxylic carbonyl group, thereby rendering the rosin non-acidic and/or incapable of forming carboxylate salts. Examples of rosin derivatives include rosin esters, which may be prepared by esterification of the carboxylic acid moieties with alcohol moieties; and rosin amides, which may be prepared by reaction of the carboxylic acid moieties (or derivatives thereof such as the aforementioned esters and acid chloride) with amine moieties. Rosin esters are preferred rosin derivatives for use in the present invention.

Preferably, one rosin or one rosin derivative is included in the thermoplastic compositions of the invention. Combinations of more than one rosin, combinations of more than one rosin derivative, and combinations of at least one rosin with at least one rosin derivative are also contemplated, however.

The compositions of this invention are comprised of mixtures of acid copolymer(s) and at least one rosin or rosin derivative that are at least partially neutralized by at least one of the alkali metal, alkaline earth metal or transition metal cations. Preferably at least 30%, alternatively at least 45%, alternatively at least 50%, alternatively at least 60% of the available acid moieties in the composition are neutralized. Cations are preferably selected from the group consisting of lithium*, sodium*, potassium, magnesium*, calcium*, barium, lead, tin, or zinc* (* indicates a more preferred cation), or a combination of such cations.

Moreover, additional neutralizing agent may be added to ionomer-rosin blends to achieve the desired state of neutralization. It will be apparent to those of skill in the art, however, that the effect of adding an additional neutralizing agent is to produce an ionomer blend that includes a rosin salt, or both a rosin and a rosin salt.

The organic acids that may be optionally employed in the present invention are those that are non-volatile and non-migratory. Organic acids that may be employed in the present invention include aliphatic, mono-functional (saturated, unsaturated, or multi-unsaturated) organic acids, particularly those having from 6 to 36 carbon atoms. Also, salts of these organic acids may be employed. Linear saturated fatty acids or fatty acid salts are preferred, particularly mono-functional organic acid(s) having from 6 to 36 carbon atoms or salts thereof.

Preferred organic acids useful in the present invention include caproic acid, caprylic acid, capric acid, lauric acid, stearic acid, behenic acid, palmitic acid and myristic acid. Stearic, behenic, palmitic and myristic acids are more preferred.

Preferably, one organic acid or one organic acid salt is included in the thermoplastic compositions of the invention. Combinations of more than one organic acid, combinations of one or more organic acid salts, and combinations of at least one organic acid with at least one organic acid salt are also contemplated, however.

Moreover, additional neutralizing agent may be added to blends including one or more organic acids to achieve the desired state of neutralization. It will be apparent to those of skill in the art, however, that the effect of adding an organic acid and an additional neutralizing agent is to produce a polymer blend that includes a salt of an organic acid, or both an organic acid and a salt of an organic acid.

The rosin or rosins and, optionally, one or more organic acids and/or salts thereof are added in an amount sufficient to enhance the hardness and/or stiffness properties of the composition over the non-modified ionomer. The rosin or rosins and optional organic acids and/or salts are preferably added in an amount of at least about 3% (weight basis) up to about 50% (weight basis) or about 60% (weight basis) of the total amount of the thermoplastic composition or blend. More preferably, the rosin or rosins and optional organic acids and/or salts thereof are added in an amount of at least about 8 or 10 weight %. Of note are compositions wherein the rosin or rosins and optional organic acids and/or salts thereof are added in an amount of at least about 20 weight %, and more preferably at least about 25 weight %.

Alternatively, one or more rosin derivatives and one or more organic acids and/or salts thereof are added in an amount sufficient to enhance the hardness and/or stiffness properties of the composition over the non-modified ionomer. The rosin derivative or derivatives may be added in an amount from about 3 weight % to about 50 weight %, and the one or more organic acids or salts thereof may also be added in an amount from about 5 weight % to about 50 weight % such that the combined weight % of the rosin derivative or derivatives and the one or more organic acids and/or salts is from about 8 or 10 weight % to about 50 or 60 weight % of the total amount of the thermoplastic composition of the invention. Of note are compositions wherein the rosin derivative or derivatives and optional organic acids and/or salts thereof are added in an amount of at least about 20 weight %, and more preferably at least about 25 weight %.

Also alternatively, when one or more rosins and one or more rosin derivatives are used in combination with, optionally, one or more organic acids and/or salts thereof, they are added in an amount sufficient to enhance the hardness properties of the composition over the non-modified ionomer. The rosins and/or rosin derivatives and optional organic acids and/or salts are preferably added in an amount of at least about 3% (weight basis) up to about 50% (weight basis) or about 60% (weight basis) of the total amount of the thermoplastic composition or blend. More preferably, the rosins and rosin derivatives and optional organic acids and/or salts thereof are added in an amount of at least about 8 or 10 weight %. Of note are compositions wherein the rosins and rosin derivatives and optional organic acids and/or salts thereof are added in an amount of at least about 20 weight %, and more preferably at least about 25 weight %.

As indicated above, the hard ionomer compositions described above may also be blended with additional non-ionomeric thermoplastic polymers. Suitable non-ionomeric thermoplastic resins include, without limitation, thermoplastic elastomers, such as polyurethane, poly-ether-ester, poly-amide-ether, polyether-urea, Pebax™ (a family of block copolymers based on polyether-block-amide, commercially supplied by Atochem of Philadelphia, Pa.), styrene-butadiene-styrene (SBS) block copolymers, styrene-(ethylene-butylene)-styrene block copolymers, etc., polyamide (oligomeric and polymeric), polyesters, polyolefins including polyethylene, polypropylene, ethylene/propylene copolymers, etc., ethylene copolymers with various comonomers, such as vinyl acetate, (meth)acrylates, (meth)acrylic acid, epoxy-functionalized monomers, CO, etc., polycarbonates, acrylics, such as methyl methacrylate homopolymers or copolymers, polystyrene, polymers functionalized with maleic anhydride, epoxidization etc., either by copolymerization or by grafting, elastomers such as EPDM, metallocene catalyzed PE and copolymer, ground-up powders of the thermoset elastomers, etc.

The thermoplastic composition of the invention may contain up to 200 parts by weight of thermoplastic non-ionomeric polymers based on 100 parts by weight of the hard ionomer blend.

An optional filler may be included in the thermoplastic composition of the invention to impart additional density to the ionomers or blends thereof with other materials. Preferred densities for the filled compositions include densities in the range starting with the density of unfilled polymer to 1.8 gm/cc. Generally, the filler will be inorganic, having a density greater than about 4 gm/cc, preferably greater than 5 gm/cc, and will be present in amounts between 0 and about 60 weight % based on the total weight of the composition. Examples of useful fillers include zinc oxide, barium sulfate, lead silicate and tungsten carbide, tin oxide, as well as the other well known corresponding salts and oxides thereof. It is preferred that the filler materials be non-reactive or almost non-reactive with the polymer components described above when the ionomers are less than completely neutralized. If the ionomers are fully neutralized, reactive fillers may be used. Zinc oxide grades, such as grade XX503R, available from Zinc Corporation of America of Monaca, Pa., that do not react readily with any free acid to cause cross-linking and a concomitant drop in MI are preferred, particularly when the ionomer is not fully neutralized.

The composition of the invention may contain up to 170 parts by weight of one or more fillers based on 100 parts by weight of the hard ionomer blend.

Other additives suitable for use in the present invention include titanium dioxide, which may be used as a whitening agent or filler; other pigments; optical brighteners; surfactants; processing aids; etc.

Fibers, including chopped fibers or pulp, and inorganic or organic materials, may also be included in the compositions of this invention to provide, for example, reinforcement or abrasion resistance.

The polymer compositions of the present invention may also include such other additives as are commonly used in thermoplastic compositions, for example stabilizers and processing aids. Suitable levels of these additives and methods of incorporating additives into polymer compositions are known to those of skill in the art. See, e.g. "Modern Plastics Encyclopedia", McGraw-Hill, New York, N.Y. 1995.

Briefly, to prepare certain thermoplastic compositions of the invention, one or more ionomers are blended with a rosin and/or a rosin derivative, and, optionally, one or more organic acids or salts thereof.

More specifically, the rosin-modified ionomers of the invention may be produced by (a) melt-blending (1) ethylene, $\alpha,\beta$ ethylenically unsaturated $C_3$ to $C_8$ carboxylic acid copolymer(s) or melt-processible ionomer(s) thereof (including copolymers with the optional addition of a softening monomer) with (2) sufficient rosin and/or rosin derivatives, and (3) optionally, sufficient non-volatile, non-migratory organic acids or salts thereof, and, concurrently or subsequently, (b) adding a sufficient amount of a source of cations in the presence of added water to achieve the desired level of neutralization of all the acid moieties, including those in the acid copolymer, rosin, and, if present, the non-volatile, non-migratory organic acids.

Alternatively, the thermoplastic compositions of the invention can be made by melt blending the rosin and/or rosin derivative and, optionally, organic acid (or salt thereof) with a melt processible ionomer and then, if necessary, further neutralizing with the same or different cations to achieve desired levels of neutralization of the resulting blend.

Also alternatively, the non-neutralized ethylene acid copolymers, rosin and/or rosin derivative, and optional organic acids or salts may be melt-blended and neutralized in situ, e.g., in an extruder. In this case the blending and the desired level of neutralization can be achieved in one step.

For example, ethylene copolymers containing (meth) acrylic acid can be melt blended with rosin, rosin salts, and, optionally, calcium stearate (or calcium salts of other organic acids); or, alternatively, with rosin and optionally stearic acid (or other organic acids), and neutralized in situ with a cation source such as sodium hydroxide to convert the rosin and stearic acid-modified copolymers into rosin salt and stearate-modified ionomers of various degrees of neutralization, up to and including 100%.

Compositions with mixed ions may be prepared by treating an already partially neutralized ionomer or ionomer blend with one or more sources of different cations. For example, an ionomer or ionomer blend that has been less than fully neutralized with sodium hydroxide can be modified to form an ionomer or ionomer blend with a mixture of sodium and magnesium ions. The mixed-cation ionomer or ionomer blend may be prepared by melt-processing the sodium ionomer or ionomer blend with an amount of magnesium hydroxide sufficient to neutralize some of the previously unneutralized acid functionalities of the sodium ionomer.

As a further example, employing a Werner & Pfleiderer (W&P) twin-screw extruder, available from Werner & Pfleiderer Lebensmitteltechnik GmbH of Dinkelsbuehl, Germany, an acid copolymer may be pre-blended with an amount of magnesium hydroxide stoichiometrically sufficient to neutralize the acid copolymer, and with a rosin and/or rosin derivatives, and, optionally, with one or more organic acids or salts of organic acids, yielding a pellet blend. The pellet blend Is melt-mixed and neutralized in the W&P twin-screw extruder in the presence of added water.

The compositions of this invention exhibit Shore D hardness above 40, and typically greater than or equal to about 50, 55, or 60. Preferred are compositions exhibiting Shore D hardness greater than or equal to 65 and more preferred are compositions exhibiting Shore D hardness greater than or equal to 70 or 75.

The compositions of this invention exhibit flex modulus above 50 kpsi, and typically greater than or equal to 60 kpsi. Of note are compositions exhibiting flex modulus greater than or equal to 65 kpsi and compositions exhibiting flex modulus greater than or equal to 70 kpsi. Preferred are compositions exhibiting modulus of greater than or equal to 75 kpsi, alternatively greater than or equal to 80 kpsi, alternatively greater than or equal to 90 kpsi, alternatively greater than or equal to 100 kpsi.

The thermoplastic compositions of the invention provide many advantageous physical properties. For example, rosin-modified ionomers of this invention may exhibit increased stiffness, Shore D hardness, flex moduli, and/or Atti compression compared to the non-modified ionomers. Also, rosin blends of ionomers with relatively low acid monomer content may be as hard as or harder than ionomers with relatively high acid monomer content.

One significant synergistic effect provided by the invention is that relatively hard or stiff compositions of the invention provide unexpected enhancements in resilience. For example, a two-piece golf ball covered with a relatively hard or stiff composition of this invention may surprisingly exhibit a higher coefficient of restitution than is exhibited by a two-piece ball consisting of an identical core covered with a more resilient composition. Likewise, a multilayer golf ball having a mantle or intermediate layer comprising a relatively hard or stiff composition of this invention may also unexpectedly exhibit a higher coefficient of restitution than is exhibited by a multilayer ball that is otherwise identical but for a more resilient material in the corresponding mantle or intermediate layer.

Furthermore, rosin type has a highly significant effect on the physical properties of the rosin-ionomer blends. It follows that the properties of The thermoplastic composition of the invention may be tailored systematically through rosin choice. The ratio of flex modulus to hardness, for example, varies significantly depending on rosin choice alone. Likewise, the melt indices of otherwise identical blends that differ only in the choice of rosin may range over more than an order of magnitude. Similar significant variations may be found in measurements of the flex moduli of otherwise identical blends.

Many of these desirable physical properties, and the relative ease with which they may be adjusted, will be advantageously used to optimize the performance profiles of golf balls.

Uses of the Hard Ionomer Composition in Golf Balls

The hard ionomer blends described herein are useful substitutions for one or more materials taught in the art at the levels taught in the art for use in covers, mantles, intermediate layers, cores, and centers of golf balls, or one-piece golf balls. See, for examples of materials for covers of golf balls, U.S. Pat. Nos. 4,274,637; 4,264,075; 4,323,247; 4,337,947, 4,398,000; 4,526,375; 4,567,219; 4,674,751; 4,884,814; 4,911,451; 4,984,804; 4,986,545; 5,000,459; 5,068,151; 5,098,105; 5,120,791; 5,155,157; 5,197,740; 5,222,739; 5,253,871; 5,298,571; 5,321,089; 5,328,959; 5,330,837; 5,338,038; 5,338,610; 5,359,000; 5,368,304; 5,567,772; 5,757,483; 5,810,678; 5,873,796; 5,902,855; 5,971,870; 5,971,871; 5,971,872; 5,973,046; 5,976,443; 6,018,003; 6,096,830; and PCT Patent Application Publication WO 99/48569.

Golf balls prepared in accordance with this invention comprise the hard ionomer blend described herein replacing any traditional golf ball material, or any golf ball cover, center, core, or intermediate layer material such as Surlyn® ionomer resin, balata rubber, thermoset or thermoplastic polyurethanes and the like.

A preferred embodiment of the thermoplastic composition of the invention for use in golf balls includes (i) at least one E/X/Y copolymer where E is ethylene, X is a $C_3$ to $C_8$ $\alpha,\beta$-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer;

(ii) from about 3 weight % to about 50 weight % of rosin, rosin derivative, or a combination of rosin and rosin derivative; and optionally (iii) from about 5 weight % to about 50 weight % of one or more organic acids or salts thereof; such that the combined weight % of component (ii) and component (iii) when present is from about 3 weight % to about 60 weight % of the total composition; wherein the combined carboxylic acid functionalities in all ingredients in the blend are at least partially neutralized by one or more alkali metal, transition metal, or alkaline earth metal cations; provided that when component (ii) consists of rosin ester, component (iii) must be present.

Of note is the composition comprising:

(i) at least one E/X/Y copolymer where E is ethylene, X is a $C_3$ to $C_8$ $\alpha,\beta$-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer; and (ii) from about 3 weight % to about 50 weight % of rosin; wherein the combined carboxylic acid functionalities in all ingredients in the blend are at least partially neutralized by one or more alkali metal, transition metal, or alkaline earth metal cations.

As indicated, the golf balls of this invention can be produced by forming covers, mantles, or other intermediate layers comprising the hard ionomer blend around cores by molding processes. For example, in compression molding, the cover composition is formed via injection at e.g. about 380° F. to about 450° F. into smooth hemispherical shells which are positioned around the core in a dimpled golf ball mold and subjected to compression molding at e.g. 200 to 450° F. for one to ten minutes, followed by cooling at 50 to 70° F. for one to ten minutes, to fuse the shells together to form a unitary ball. In one type of injection molding, the cover or mantle composition is injected directly around the core placed in the center of a golf ball mold for a period of time at a mold temperature from about 50° F. to 150° F.

One-piece balls, cores and centers may be prepared by similar injection molding methods.

After molding, the golf balls produced may undergo various further processing steps such as buffing, painting and marking.

Said golf balls will have a traditional dimple pattern and may be coated with a polyurethane coating or be painted for appearance purposes, but such a coating and/or painting will not affect the performance characteristics of the ball. However, coating and/or painting may affect the scuff resistance of the ball. In particular, such coating and/or painting may improve scuff resistance over that of an unfinished ball. For the purposes of this invention, any coating and/or painting and/or marking are not considered to be part of a golf ball cover.

One-piece Golf Ball

As used herein, the term "one-piece ball" refers to a golf ball molded from a thermoplastic composition, i.e., not having elastomeric windings, cores or mantles and in which the whole ball is a homogeneous solid spheroid. As noted above, one-piece balls are manufactured by direct injection molding techniques or by compression molding techniques. The hard ionomer blend described herein is used in such balls in combination with other materials typically used in these balls to prepare a golf ball of this invention. Of note are one-piece golf balls in which a composition of the invention forms the entirety of the ball.

As used herein, the term "multi-piece ball" refers to two-piece, 3-piece and multilayer golf balls as described further below.

Two-piece Golf Ball

As used herein, the term "two-piece ball" refers to a golf ball comprising a core and a cover. As noted above, two-piece balls may be manufactured by first molding the core from a thermoset or thermoplastic composition, positioning these preformed cores in injection molding cavities using retractable pins, then injection molding the cover material around the cores. Alternatively, covers can be produced by compression molding cover material over the cores. The hard ionomer blend described herein can be used as the core, or preferably the cover of such golf balls to prepare a golf ball of this invention.

Three-piece Golf Ball

As used herein, the term "three-piece ball" refers to a golf ball comprising a center, a traditional elastomeric winding wound around the center, and a cover. Three-piece golf balls may be manufactured by well-known techniques as described in detail in, for example, U.S. Pat. No 4,846,910. The hard ionomer blends described herein can be used as the cover and/or the center of such golf balls to prepare a golf ball of this invention.

Multilayer Golf Ball

As used herein, the term "multilayer ball" refers to a golf ball comprising a core, a cover, and one or more mantles or intermediate layers between the core and the cover. As noted above, multilayer balls may be manufactured by first molding or making the core, typically compression or injection molding the mantle(s) over the core and then compression or injection molding a cover over the mantle.

As indicated above, golf ball cores in multipiece balls may be solid or wound. Solid cores may be molded in one piece using compression or injection molding techniques. A wound core is generally produced by winding a very large elastic thread around a solid center or a liquid-filled balloon center. As indicated, additional mantle layers may be applied over the core to produce a multilayer ball. For the purposes of this invention, the term solid core indicates a molded core without the rubber band winding. Golf ball cores or centers typically comprise thermoset polyurethane or thermoplastic urethane resin.

The hard ionomer blends described herein can be used in the solid core, mantle, intermediate layers, or the cover of multipiece golf balls of this invention.

The specific combinations of resilience and compression used in the practice of the subject invention will in large part be dependent upon the type of golf ball desired (e.g., one-piece, two-piece, three-piece, or multilayer), and in the type of performance desired for the resulting golf ball as detailed below. In addition, a golf ball typically must meet the maximum mass limit (not to exceed 45.93 grams) and minimum size limit (diameter not less than 1.680 inches or 42.67 mm) set by the United States Golfing Association (U.S.G.A.) or some other limit set by a golfer's governing authority. Preferably, the ball has a density of about 1.128 g/cm$^3$.

In two-piece, three-piece or multilayer balls, sufficient filler may be added to one or more components (i.e. core, mantle, intermediate layer, and/or covers) of the golf ball to adjust the mass of the golf ball to a level meeting the limits set by the golfer's governing authority. The above described mass and size regulations are imposed on the golf ball taken as a whole. It follows that the density of a golf ball need not be constant with respect to its radius. Accordingly, the densities of various components of the ball comprising the thermoplastic composition of the invention may be adjusted with filler(s) to varying values, including densities greater or less than 1.128 g/cm$^3$, provided that the golf ball as a whole does not exceed the maximum weight or fall below the minimum diameter requirements of the golfer's governing authority. Of note are one-piece balls wherein sufficient filler is added to the composition of this invention to adjust the density such that the mass of a golf ball formed from the filled composition is adjusted to meet the limits set by the golfer's governing authority. Preferably, enough filler is used so that the ball has a density of about 1.128 g/cm$^3$.

Uses of the Hard Ionomer Composition in Other Applications

As indicated above, the thermoplastic compositions of the invention comprising an ionomer and a rosin, a rosin derivative, or both a rosin and a rosin derivative may be useful in a wide range of objects other than one-piece golf balls and covers, mantles, intermediate layers, cores, and centers of multipiece golf balls.

A preferred embodiment for use in objects other than golf balls comprises (i) at least one E/X/Y copolymer where E is ethylene, X is a $C_3$ to $C_8$ α,β-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer;

(ii) from about 3 weight % to about 50 weight % of rosin, rosin derivative, or a combination of rosin and rosin derivative; and optionally (iii) from about 5 weight % to about 50 weight % of one or more organic acids or salts thereof; such that the combined weight % of component (ii) and component (iii) when present is from about 3 weight % to about 60 weight % of the total composition; wherein the combined carboxylic acid functionalities in all ingredients in the blend are at least partially neutralized by one or more alkali metal, transition metal, or alkaline earth metal cations.

Suitable and preferred optional components and concentration ranges are as described above in reference to the embodiments of the invention that are useful in golf balls.

For example, the composition of the invention may be useful in other sporting equipment applications, particularly in golf shoe cleats, various components of golf clubs such as golf club face plates or inserts, molded golf club heads, club head coatings or casings, and fillers for inner cavity of a golf club head, and the like.

This composition may also be used in place of materials taught in the art for use in club faces, such as poly-imides reinforced with fillers or fibers, methyl (meth)acrylate copolymers, carbon-fiber reinforced polycarbonate, materials based on PMMA and crosslinkable monomers, and cross-linked synthetic rubber. This composition may also be substituted for the cured acrylic monomer, oligomer, polymer used to impregnate wood club heads, for rubber-like elastic cores in club heads, and for molded polyurethane club heads. As such, golf club heads can be prepared having a front striking face adapted to strike a ball and an insert mounted on the striking face, said insert comprising a molded article comprising the composition above. In addition, golf club heads comprising a metal body and an insert plate secured to the forward striking surface of the metal body and made of the composition above laminated with an outer metal layer formed with grooves. In addition, this invention also includes a golf club having a shaft with a club head affixed to the shaft, wherein the club head is described above, having a component comprising the composition above.

The composition of the invention may also be useful for preparing molded articles that are footwear structural components, such as heel counters, toe puffs and soles as well as cleats for footwear. Footwear structural components such as heel counters, toe puffs, and soles provide shape support for footwear construction. The term "heel counter" as used herein refers to a stiff, curved piece that provides shape and structure to the heel area of a shoe. The term "toe puff" (or "toe box") as used herein refers to a stiff, arched piece that provides shape and structure to the toe area of a shoe. The term "sole" as used herein refers to a stiff, generally flat piece that provides shape and structure to the bottom of a shoe. These structural components are typically incorporated into the internal structure of the shoe and covered with additional components for wear and/or appearance.

See, for examples of materials and applications, particularly pertaining to golf equipment and shoes, U.S. Pat. No. 3,836,153; U.S. Pat. No. 4,326,716; U.S. Pat. No. 4,504,520; U.S. Pat. No. 5,078,398; U.S. Pat. No. 6,146,571; EP 737,493B; FR 2523854A; GB 2132092B; JP 02124182A; JP 04144704A; JP 04002375A; JP 09225076A; JP 57203460A; JP 59194802A; JP 62224382A; JP 3302407B; JP 92015702B; WO 2002004694; and WO 2002010470.

The composition of the invention may also be useful in non-sporting good applications such as caulking materials, sealants, modifiers for cement and asphalt, and coatings. In addition, the compositions of the invention may also be useful in toys, decorative objects, and containers for inert materials.

Of particular note are the following embodiments of the invention:

1. A thermoplastic composition comprising:

(i) at least one E/X/Y copolymer where E is ethylene, X is a $C_3$ to $C_8$ α,β-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer;

(ii) from about 3 weight % to about 50 weight % of rosin; or from about 3 weight % to about 50 weight % of rosin ester; and optionally (iii) from about 5 weight % to about 50 weight % of one or more organic acids or salts thereof; such that the combined weight % of component (ii) and component (iii) when present is from about 3 weight % to about 60 weight % of the total composition; wherein the combined carboxylic acid functionalities in all ingredients in the blend are at least partially neutralized by one or more alkali metal, transition metal, or alkaline earth metal cations; provided that when component (ii) consists of rosin ester, component (iii) must be present.

2. Composition 1 comprising (i) at least one E/X/Y copolymer where E is ethylene, X is a $C_3$ to $C_8$ α,β-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer; and (ii) from about 3 weight % to about 50 weight % of rosin; wherein the combined carboxylic acid functionalities in all ingredients in the blend are at least partially neutralized by one or more alkali metal, transition metal, or alkaline earth metal cations.

3. Composition 1 or 2 further comprising at least one additional component selected from non-ionomeric thermoplastic polymers.

4. Composition 3 wherein said at least one non-ionomeric thermoplastic polymer is selected from the group consisting of polyurethanes; polyureas; polyamides; polyesters; polystyrenes; acrylic polymers; polycarbonates; copoly-ether-esters; copoly-ether-amides; copoly-ether-urethanes; copoly-ether-ureas; polyolefins; elastomeric polyolefins; ethylene-propylene-diene monomer polymer; metallocene-catalyzed polyethylenes and polypropylenes; ethylene copolymers with polar comonomers such as vinyl acetate, alkyl (meth)acrylates, carbon monoxide, and epoxy-containing comonomers; maleic anhydride modified polymers; and thermoplastic elastomers based on styrene-butadiene block copolymers and derivatives.

5. Compositions 1 through 4 exhibiting Shore D hardness greater than or equal to about 60.

6. Composition 5 exhibiting Shore D hardness greater than or equal to 65.

7. Composition 6 exhibiting Shore D hardness greater than or equal to 70.

8. Compositions 1 through 4 exhibiting flex modulus greater than or equal to 60 kpsi.

9. Composition 8 exhibiting flex modulus greater than or equal to 65 kpsi.

10. Composition 9 exhibiting flex modulus greater than or equal to 70 kpsi.

11. Composition 10 exhibiting flex modulus greater than or equal to 75 kpsi.

12. Composition 11 exhibiting flex modulus greater than or equal to 80 kpsi.

13. Composition 12 exhibiting flex modulus greater than or equal to 90 kpsi.

14. Composition 13 exhibiting flex modulus greater than or equal to 100 kpsi.

15. A one-piece golf ball comprising one or more of compositions 1 through 14.

16. Golf ball 15 wherein sufficient filler is added to the composition used to prepare the golf ball to adjust the mass of the golf ball to a level meeting the limits set by the golfer's governing authority.

17. A one-piece golf ball consisting essentially of one or more of compositions 1 through 14.

18. A multi-piece golf ball wherein any of the following components that form the golf ball selected from the group consisting of the cover, the mantle, any intermediate layer, the core and the center comprises one or more of thermoplastic compositions 1 through 14.

19. Golf ball 18, wherein at least one of said components that form the golf ball comprises one or more of compositions 1 through 14 and at least one other component comprises a non-ionomeric thermoplastic polymer.

20. Golf ball 18 having a cover comprising one or more of compositions 1 through 14.

21. Golf ball 19 having a core of a thermoplastic or thermoset composition, a mantle or intermediate layer comprising one or more of thermo plastic compositions 1 through 14, and a relatively softer cover.

22. Golf ball 21 wherein the cover comprises a thermoset polyurethane or thermoplastic urethane resin.

23. A multi-piece golf ball wherein any of the following components that form the golf ball selected from the group consisting of the cover, the mantle, any intermediate layer, the core and the center consists essentially of at least one of thermoplastic compositions 1 through 14.

24. Golf balls 18 through 23 wherein sufficient filler is added to one or more components of the golf ball to adjust the mass of the golf ball to a level meeting the limits set by the golfer's governing authority.

25. A molded article selected from the group consisting of sports shoe cleats, golf club face plates or inserts, molded golf club heads, club head coatings or casings, fillers for the inner cavity of a golf club head, and footwear structural components comprising a thermoplastic composition comprising:

(i) at least one E/X/Y copolymer where E is ethylene, X is a $C_3$ to $C_8$ α,β-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer;

(ii) from about 3 weight % to about 50 weight % of rosin, rosin ester, or both rosin and rosin ester; and optionally (iii) from about 5 weight % to about 50 weight % of one or more organic acids or salts thereof; such that the combined weight % of component (ii) and component (iii) when present is from about 3 weight % to about 60 weight % of the total composition; wherein the combined carboxylic acid functionalities in all ingredients in the blend are at least partially neutralized by one or more alkali metal, transition metal, or alkaline earth metal cations; and optionally further comprising at least one non-ionomeric thermoplastic resin.

26. The molded article 25 that is a footwear structural component selected from the group consisting of heel counters, toe puffs, and soles.

27. A caulking material, sealant, modifier for cement and asphalt, or coating comprising a thermoplastic composition comprising:

(i) at least one E/X/Y copolymer where E is ethylene, X is a $C_3$ to $C_8$ α,β-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer;

(ii) from about 3 weight % to about 50 weight % of rosin, rosin ester, or both rosin and rosin ester; and, optionally, (iii) from about 5 weight % to about 50 weight % of one or more organic acids or salts thereof; such that the combined weight % of component (ii) and component (iii) when present is from about 3 weight % to about 60 weight % of the total composition; wherein the combined carboxylic acid functionalities in all ingredients in the blend are at least partially neutralized by one or more alkali metal, transition metal, or alkaline earth metal cations; and optionally further comprising at least one non-ionomeric thermoplastic resin.

28. A golf club having a shaft with a club head affixed to the shaft, the club head having a front striking face adapted to strike a ball and an insert mounted on the striking face, said insert comprising molded article 25.

29. A golf club head comprising a metal body and an insert plate secured to the forward striking surface of the metal body and made of a composition comprising:

(i) at least one E/X/Y copolymer where E is ethylene, X is a $C_3$ to $C_8$ α,β-ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer;

(ii) from about 3 weight % to about 50 weight % of rosin, rosin ester, or both rosin and rosin ester; and, optionally, (iii) from about 5 weight % to about 50 weight % of one or more organic acids or salts thereof; such that the combined weight % of component (ii) and component (iii) when present is from about 3 weight % to about 60 weight % of the total composition; wherein the combined carboxylic acid functionalities in all ingredients in the blend are at least partially neutralized by one or more alkali metal, transition metal, or alkaline earth metal cations; and optionally further comprising at least one non-ionomeric thermoplastic resin; said composition laminated with an outer metal layer formed with grooves.

31. A method of increasing the hardness and/or stiffness of an ionomer by blending the ionomer with a rosin, a rosin ester, or both a rosin and a rosin ester.

32. A method of increasing the coefficient of resilience of a golf ball by providing an ionomer, blending the ionomer with a rosin, a rosin ester, or both a rosin and a rosin ester to form an ionomer blend, and forming the ionomer blend into a core, a center, a mantle, a layer, a cover, or the entirety of the golf ball.

33. A method of increasing the hardness and/or stiffness of a golf ball by providing an ionomer, blending the ionomer with a rosin, a rosin ester, or both a rosin and a rosin ester to form an ionomer blend, and forming the ionomer blend into a core, a center, a mantle, a layer, a cover, or the entirety of the golf ball.

Without further elaboration, it is believed that one skilled in the art using the preceding description can utilize the present invention to its fullest extent. The following examples are provided to describe the invention in further detail. These examples, which set forth a preferred mode presently contemplated for carrying out the invention, are intended to illustrate and not to limit the invention.

EXAMPLES

Analytical Protocols

Melt Index (MI) was measured in accord with ASTM D-1238, condition E, at 190° C., using a 2160-gram weight, with values of MI reported in grams/10 minutes.

Shore D hardness was determined in accord with ASTM D-2240. Shore D hardness was also measured on the neat resin spheres as reported.

Coefficient of Restitution (COR) is a measurement of the elastic properties of a sphere and is an indicator of the resilience of its composition, that is, its ability to rebound after impact. The COR is measured by firing a sphere, having a size approximately 1.51 inches in diameter, from an air cannon at a fixed velocity determined by the air pressure within the barrel of the cannon. The sphere can be an injection-molded neat sphere of the test resin, or it can be a multi-piece ball. The sphere strikes a steel plate positioned three feet away from the point where initial velocity is determined, and rebounds through a speed-monitoring device located at the same point as the initial velocity measurement. The return velocity divided by the initial velocity is the COR. The initial velocity generally employed is 125 feet/second (COR-125).

Atti Compression (Atti Comp.), also known as PGA Compression, is defined as the resistance to deformation of a golf ball, measured using an Atti Compression Gauge. The Atti Compression Gauge is designed to measure the resistance to deformation or resistance to compression of golf balls that are 1.680 inches in diameter. In these examples, smaller spheres approximately 1.51 inches in diameter were used. Spacers or shims were therefore used to compensate for this difference in diameter. After the sphere diameters were measured, one or more shims of different thicknesses were selected to correct the sphere diameter plus total shim thickness to within 0.0025 inches of 1.680 inches.

After the PGA compression of the sphere and shim(s) was measured, the resulting value was mathematically corrected, using standard methods, to compensate for the deviation of the diameter of the sphere from the ideal of 1.680 inches. Specifically, if the sphere diameter plus shim thickness was less than 1.680 inches, one compression unit was added for every 0.001 inch less than 1.680 inches. If the sphere diameter plus shim thickness was greater than 1.680 inches, one compression unit was subtracted for every 0.001 inch greater than 1.680 inches.

Impact durability was determined by firing two-piece golf balls having the hard ionomer composition of the invention as the cover over a commercial thermoset polybutadiene core at a steel plate at 175 feet per second repeatedly until the golf ball cracks upon impact with the steel plate. The durability, or number of hits against the steel plate, as reported herein, is the average durability measured for three golf balls.

Materials Used

Non-neutralized ethylene/(meth)acrylic acid copolymers are commercially available from DuPont under the trade name Nucrel®. Ionomer base resins are commercially available from DuPont under the trade name Surlyn®. The ionomers used in the Examples are derived from ethylene/(meth)acrylic acid copolymers with either 15 weight % or 19 weight % methacrylic acid that have melt indices (MI) of about 60. The ethylene/(meth)acrylic acid copolymers are neutralized under standard conditions to provide the ionomer resins. Ionomer resins used in these Examples include the following:

Table of Ionomer Resins

A: E/15% MAA, 47% neut. w. Li, with MI of 2.6.
B: E/15% MAA, 52% neut. w. Li, with MI of 1.8
C: E/15% MAA, 59% neut. w. Na, with MI of 0.93
D: E/19% MAA, 37% neut. w. Na, with MI of 2.6
E: E/19% MAA, 36% neut. w. Zn, with MI of 1.3
F: E/19% MAA, 40% neut. w. Mg, with MI of 1.1
G: E/19% MAA, 45% neut. w. Li, with MI of 1.1

Notes for Table of Ionomer Resins:
E represents ethylene, MAA represents methacrylic acid, and the percentages of MAA represent the weight % of MAA present in the copolymer. The neutralization level is given as the percentage of the available carboxylic acid moieties neutralized, and the atomic symbol of the neutralizing cation is listed.

Rosin salt is commercially available from Resinall Corporation of Stamford, Conn. (Resinall) under the tradename Resinall™. Grades used include the following:

Rosin

H: Resinall ™ 153 (9% ZnO modified rosin resinate)
I: Resinall ™ 154 (6% ZnO modified rosin resinate)

Compositions according to the invention were prepared by melt blending the ionomer resins and the rosin salt modifier employing a Werner & Pfleiderer twin-screw extruder. After blending, the compositions were extruded into the appropriate shapes for mechanical property testing.

Comparative Examples are the ionomers or ionomer blends without the rosin modifier, prepared and extruded in similar fashion. They are numbered to correspond to the Examples of the compositions of the invention (e.g. Examples 1 and 4 use the same ionomer base resin as Comparative Example C1/4; however, Examples 1 and 4 also contain the rosin indicated). In Tables 1 and 2, the term "- -" indicates that a component is not present in the composition.

In the compositions set forth below as Examples and Comparative Examples, the percentage given for each component refers to a weight percent based on the total weight of the thermoplastic blend, unless otherwise indicated in specific instances.

Examples 1-13 and Comparative Examples

Thermoplastic compositions of the invention prepared as Examples 1 through 13 are reported in Table 1. The compositions were injection molded into flex bars for mechanical property tests. After two weeks of annealing at ambient temperature (approximately 23° C.), the Shore D hardness was measured and is reported in Table 1. The compositions were also injection molded and, as resin spheres, tested for golf ball properties after more than two weeks of aging at ambient temperature. The Atti compression and the coefficients of restitution of the neat spheres are also reported in Table 1.

TABLE 1

| Example | Ionomer | Ionomer | Rosin | Atti Comp. | COR-125 | Shore D |
|---|---|---|---|---|---|---|
| 1 | 80% A | — | 20% H | 162 | 0.717 | 66 |
| 2 | 80% B | — | 20% H | 160 | 0.715 | 66 |
| 3 | 80% C | — | 20% H | 157 | 0.691 | 65 |
| 4 | 80% A | — | 20% I | 157 | 0.713 | 65 |
| 5 | 80% B | — | 20% I | 158 | 0.712 | 66 |
| 6 | 80% C | — | 20% I | 158 | 0.699 | 65 |
| 7 | 40% A | 40% C | 20% H | 158 | 0.714 | 67 |
| 8 | 40% B | 40% C | 20% H | 160 | 0.714 | 67 |
| 9 | 40% D | 40% E | 20% H | 167 | 0.74 | 70.4 |
| 10 | 40% D | 40% F | 20% H | 167 | 0.747 | 71.2 |
| 11 | 40% D | 40% G | 20% H | 165 | 0.749 | 70.8 |
| 12 | 40% E | 40% G | 20% H | 169 | 0.74 | 70.7 |
| 13 | 40% F | 40% G | 20% H | 169 | 0.735 | 70 |
| C1/4 | 100% A | — | — | 153 | 0.738 | 63 |
| C3/6 | 100% C | — | — | 150 | 0.732 | 62 |
| C7 | 50% A | 50% C | — | 154 | 0.741 | 63 |
| C9 | 50% D | 50% E | — | 160 | 0.746 | 63.2 |
| C10 | 50% D | 50% F | — | 159 | 0.767 | 65.7 |
| C11 | 50% D | 50% G | — | 161 | 0.768 | 65.8 |
| C12 | 50% E | 50% G | — | 156 | 0.754 | 63.7 |
| C13 | 50% F | 50% G | — | 160 | 0.764 | 66.1 |
| 14 | 40% A | 40% C | 20% I | 157 | 0.713 | 64 |
| 15 | 40% B | 40% C | 20% I | 159 | 0.715 | 65 |

The data presented in Table 1 show that the rosin-modified ionomers of this invention exhibit increased Shore D hardness and Atti compression compared to the non-modified ionomers (see, for example, the comparison between Examples 1 and 4 versus Comparative Example C1/4). Also, rosin-modified ionomers with lower acid comonomer content can be hardened to Shore D values comparable to or exceeding those exhibited by non-modified ionomers with higher acid comonomer content (see, for example, the comparison between Examples 1 and 4 versus Comparative Example C9).

Examples 21-28, 31-36 and Comparative Examples

Thermoplastic compositions of this invention designated as Examples 21 through 28 and 31 through 36 are reported in Table 2. These compositions were injection molded into flex bars for mechanical property tests. After two weeks of annealing at ambient temperature (approximately 23° C.), the Shore D hardness and the flex moduli were measured. In addition, the compositions were injection molded into neat resin spheres and tested for golf ball properties after more than two weeks of aging at ambient temperature. The Atti compressions, Shore D hardness, and the coefficients of restitution of the neat spheres are also reported in Table 2.

TABLE 2

| Ex. | Ionomer | Ionomer | Rosin | Material Property Shore D Hardness | Flex Mod. (kpsi) | Neat Resin Sphere Property Atti Comp. | COR-125 | Shore D hardness |
|---|---|---|---|---|---|---|---|---|
| 21 | 47.5% B | 47.5% C | 5% H | 61 | 63.7 | 154 | 0.728 | 66 |
| 22 | 45% B | 45% C | 10% H | 62 | 66.3 | 157 | 0.721 | 67 |
| 23 | 40% B | 40% C | 20% H | 65 | 77.8 | 159 | 0.702 | 68 |
| 24 | 35% B | 35% C | 30% H | 66 | 85.4 | 162 | 0.684 | 70 |
| 25 | 47.5% D | 47.5% F | 5% H | 67 | 81.9 | 159 | 0.751 | 67 |
| 26 | 45% D | 45% F | 10% H | 66 | 81.6 | 163 | 0.741 | 69 |
| 27 | 40% D | 40% F | 20% H | 68 | 97.2 | 161 | 0.727 | 71 |
| 28 | 35% D | 35% F | 30% H | 66 | 99.9 | 166 | 0.712 | 72 |
| C21-24 | 50% B | 50% C | — | 63 | 59.5 | 150 | 0.736 | 64 |
| C25-28 | 50% D | 50% F | — | 66 | 79.5 | 160 | 0.756 | 67 |
| 31 | 80% A | — | 20% H | 69.5 | 91.7 | 160 | 0.709 | 69 |
| 32 | 75% A | — | 25% H | 71.8 | 96 | 162 | 0.700 | 69 |
| 33 | 40% D | 40% F | 20% H | 71.3 | 109.7 | 164 | 0.729 | 71 |
| 34 | 37.5% D | 37.5% F | 25% H | 73 | 117.6 | 165 | 0.724 | 71 |
| 35 | 40% D | 40% G | 20% H | 70.8 | 111.2 | 164 | 0.739 | 71 |
| 36 | 40% D | 40% G | 25% H | 74 | 116.9 | 167 | 0.731 | 72 |
| C33/34 | 50% D | 50% F | — | NA | NA | 160 | 0.756 | 67 |

The data presented in Table 2 show that the rosin-modified ionomers of this invention exhibit either increased Shore D hardness and/or flex modulus compared to the non-modified ionomer (see, for example, the comparison between Examples 21 and 24 versus Comparative Example C21-24). Examples of rosin-modified ionomers with lower acid comonomer content can be hardened to Shore D values comparable to or exceeding those exhibited by non-modified ionomers with higher acid comonomer content (see, for example, the comparison between Example 24 versus Comparative Example C25-28).

The data in Table 2 also indicate that the hard ionomer blends of this invention exhibit flex moduli ranging from about 60 to about 120.

Moreover, certain hard ionomer blends of the invention exhibit melt indices ranging from about 1 to about 3, as shown in Table 3, indicating that the invention provides the potential to select more favorable processing conditions for relatively harder or stiffer materials.

TABLE 3

| Example | Ionomer | Ionomer | Rosin | M. I. |
|---|---|---|---|---|
| 31 | 80% A | — | 20% H | 2.3 |
| 32 | 75% A | — | 25% H | 2.2 |
| 33 | 40% D | 40% F | 20% H | 1.3 |
| 34 | 37.5% D | 37.5% F | 25% H | 1.3 |
| 35 | 40% D | 40% G | 20% H | 1.1 |
| 36 | 40% D | 40% G | 25% H | 1.1 |

Examples 37 to 42 and Comparative Examples

Examples 37 to 42 and Comparative Examples C39 and C43 were prepared by injection molding the compositions of Examples 31 to 36, C33/34, and C21-24, respectively (as indicated in Table 4) over identical conventional thermoset polybutadiene cores to prepare two-piece balls.

TABLE 4

| Example | Cover Composition (From Table 2) | Atti Comp. | COR-125 | Shore D hardness | Impact Durability |
|---|---|---|---|---|---|
| 37 | 31 | 92 | 0.781 | 68 | 6.4 |
| 38 | 32 | 98 | 0.784 | 69 | 10.6 |
| 39 | 33 | 105 | 0.800 | 70 | 13.4 |
| 40 | 34 | 103 | 0.790 | 70 | 12.4 |
| C39 | C33/34 | 102 | 0.791 | 67 | 36 |
| 41 | 35 | 103 | 0.793 | 71 | 10.2 |
| 42 | 36 | 107 | 0.793 | 71 | 10.0 |
| C43 | C21-24 | 94 | 0.779 | 65 | 26.2 |

These results demonstrate that a two-piece ball (e.g., Example 39) covered with a stiffer composition of this invention (e.g., Example 33) exhibits a higher COR than that exhibited by a 2-piece ball (Comparative Example C39) consisting of an identical thermoset core covered with a more resilient composition (e.g., Comparative Example C33). Thus, although Example 33 has a lower COR than Comparative Example C33 (when tested as a neat resin sphere as reported in Table 2), when used as a cover over a thermoset core in a 2-piece ball, it provides enhanced resilience.

Examples 43-48

Hard ionomer compositions of this invention prepared as Examples 43 through 48 are reported in Table 5. The compositions were injection molded into flex bars for mechanical property tests. After two weeks of annealing at ambient temperature (approximately 23° C.), the Shore D hardness and the flex moduli were measured as described below and are reported in Table 5.

TABLE 5

| Example | Ionomer | Ionomer | Rosin | M. I. | Hardness, Shore D | Flex modulus, kpsi |
|---|---|---|---|---|---|---|
| 43 | 37.5% D | 37.5% F | 25% P | 13.9 | 73 | 81 |
| 44 | 37.5% D | 37.5% F | 25% R | 12.6 | 74 | 117 |

TABLE 5-continued

| Example | Ionomer | Ionomer | Rosin | M. I. | Hardness, Shore D | Flex modulus, kpsi |
|---|---|---|---|---|---|---|
| 45 | 37.5% D | 37.5% F | 25% S | 9.5 | 68 | 81 |
| 46 | 37.5% D | 37.5% F | 25% V | 7.5 | 75 | 135 |
| 47 | 37.5% D | 37.5% F | 25% VN | 0.6 | 74 | 93 |
| 48 | 37.5% D | 37.5% F | 25% J | 1.6 | 74 | 76 |

Key to rosins in Table 5:
P: Poly-Pale ™, a partially dimerized rosin available from Eastman
R: Dymerex ™, a dimerized rosin available from Eastman
S: Staybelite ™ A, a partially hydrogenated rosin available from Eastman
V: Vinsol ™, a dark rosin available from Eastman
VN: Vinsol ™ NVX, a sodium salt of Vinsol ™, available from Eastman
J: Resinal ™ 130, available from Resinall The data in Table 5 demonstrate that rosin type has a highly significant effect on the physical properties of the rosin-ionomer blends. For example, the melt indices of otherwise identical blends that differed only in the choice of rosin ranged over more than an order of magnitude. Similarly, the greatest variation between flex moduli in this series is approximately a factor of two.

It is also apparent from the results in that the properties of the thermoplastic composition of the invention may be tailored systematically through resin choice. The ratio of flex modulus to hardness, for example, varies by a factor of two depending on rosin choice alone.

Examples 49-50

Hard ionomer compositions of this invention prepared as Examples 49 and 50 are reported in Table 6. The compositions were injection molded into flex bars for mechanical property tests. After two weeks of annealing at ambient temperature (approximately 23° C.), the Shore D hardness and the flex moduli were measured and are reported in Table 7.

TABLE 6

| Example | Ionomer | Organic acid salt | Mg(OH)2 | Rosin | MI |
|---|---|---|---|---|---|
| 49 | 48% F | 31.04% Ca stearate | 0.96% Mg(OH)2 | 20% H | 0.42 |
| 50 | 42% F | 27.16% Ca stearate | 0.84% Mg(OH)2 | 30% H | 0.47 |

TABLE 7

| Example | Plaque Hardness Shore D | Flex modulus, kpsi |
|---|---|---|
| 49 | 65 | 42 |
| 50 | 66 | 40 |

The data in Table 7 demonstrate that the addition of organic acid salts to the thermoplastic blends of the invention results in a numerical lowering of all measured physical properties when compared to similar examples that do not include organic acid salts, e.g., Example 10 and Comparative Example C25-28.

Having thus described and exemplified the invention with a certain degree of particularity, it should be appreciated that the following claims are not to be so limited but are to be afforded a scope commensurate with the elements of the following claims and the equivalents thereof.

What is claimed is:

1. A golf ball comprising a thermoplastic composition, said thermoplastic composition comprising:
   (i) at least one E/X/Y copolymer wherein E represents copolymerized residues of ethylene, X represents copolymerized residues of a $C_3$ to $C_8$ $\alpha,\beta$-ethylenically unsaturated carboxylic acid, and Y represents copolymerized residues of a softening comonomer selected from alkyl acrylate and alkyl methacrylate, wherein the alkyl groups have from one to eight carbon atoms, wherein the amount of X is from about 2 to about 30 weight % of the E/X/Y copolymer, wherein the amount of Y is from 0 to about 40 weight % of the E/X/Y copolymer, and wherein the carboxylic acid functionalities are at least partially neutralized by one or more alkali metal, transition metal, or alkaline earth metal cations; and
   (ii) at least one rosin salt;
   (iii) optionally, one or more organic acids, one or more salts of organic acids, or both an organic acid and a salt of an organic acid, provided that said one or more organic acids and one or more salts of organic acids do not comprise rosin acids or salts of rosin acids; and
   (iv) optionally, one or more additives selected from the group consisting of fillers, whitening agents, pigments, optical brighteners, surfactants, processing aids, fibers, and stabilizers.

2. The golf ball of claim 1 wherein component (ii) consists essentially of one or more rosin salts.

3. The golf ball of claim 1, wherein said thermoplastic composition further comprises the one or more organic acids, the one or more salts of organic acids, or both the organic acid and the salt of an organic acid.

4. The golf ball of claim 1, wherein the at least one rosin salt is present in an amount of from about 3 weight percent to about 50 weight percent and, when the one or more organic acids, the one or more salts of organic acids, or both the organic acid and the salt of an organic acid are present the combination of the at least one rosin salt and the organic acids and salts of organic acids is present in an amount of 3 weight percent to about 60 weight percent.

5. The golf ball of claim 1, wherein said thermoplastic composition exhibits Shore D hardness greater than or equal to about 60.

6. The golf ball of claim 1, wherein said thermoplastic composition exhibits Shore D hardness greater than or equal to 65.

7. The golf ball of claim 1, wherein said thermoplastic composition exhibits Shore D hardness greater than or equal to 70.

8. The golf ball of claim 1, wherein said thermoplastic composition exhibits flex modulus greater than or equal to 60 kpsi.

9. The golf ball of claim 1, wherein said thermoplastic composition exhibits flex modulus greater than or equal to 75 kpsi.

10. The golf bait of claim 1, wherein said thermoplastic composition exhibits flex modulus greater than or equal to 80 kpsi.

11. The golf ball of claim 1, wherein said thermoplastic composition exhibits flex modulus greater than or equal to 90 kpsi.

12. The golf ball of claim 1, wherein said thermoplastic composition exhibits flex modulus greater than or equal to 100 kpsi.

13. The golf ball of claim 1 being a one-piece golf ball.

14. The one-piece golf ball of claim 13 wherein sufficient filler is added to the thermoplastic composition to adjust the weight of the golf ball to a level meeting the limits set by a golfer's governing authority.

15. The one-piece golf ball of claim 13 consisting essentially of the thermoplastic composition.

16. The golf ball of claim 1 being a multi-piece golf ball, and wherein one or more of the components that form the golf ball, said component or components selected from the group consisting of a cover, a mantle, one or more intermediate layers, a core, and a center, comprises the thermoplastic composition.

17. The multi-piece golf ball of claim 16, wherein at least one other component selected from the group consisting of a cover, a mantle, one or more intermediate layers, a core, and a center comprises a non-ionomeric thermoplastic polymer.

18. The multi-piece golf ball of claim 16 wherein the core comprises a thermoplastic or thermoset composition, the component is a mantle or one or more intermediate layers, and the cover is relatively softer than the mantle or at least one of the intermediate layers.

19. The multi-piece golf ball of claim 18 wherein the cover comprises a thermoset polyurethane or a thermoplastic polyurethane resin.

20. The multi-piece golf ball of claim 16 wherein one or more of the components of the golf ball, said one or more components selected from the group consisting of a cover, a mantle, one or more intermediate layers, a core, and a center, consists essentially of the thermoplastic composition.

21. The multi-piece golf bail of claim 16 wherein sufficient filler is added to one or more components of the golf ball to adjust the weight of the golf ball to a level meeting the limits set by a golfers governing authority.

22. A method of increasing the coefficient of resilience of a golf ball by providing an ionomer, blending the ionomer with at least one rosin salt to form an ionomer blend, and forming the ionomer blend into a core, a center, a mantle, a layer, or a cover of the golf ball.

23. A method of increasing the hardness and/or stiffness of a golf ball by providing an ionomer, blending the ionomer with at least one rosin salt to form an ionomer blend, and forming the ionomer blend into a core, a center, a mantle, a layer, or a cover of the golf ball.

* * * * *